United States Patent [19]

Wolfe

[11] 4,268,394

[45] May 19, 1981

[54] BEACH FOR THE SCUM TROUGH OF A SEWAGE SETTLING TANK OR THE LIKE

[75] Inventor: Gerald D. Wolfe, Zelienople, Pa.

[73] Assignee: Sybron Corporation, Rochester, N.Y.

[21] Appl. No.: 134,852

[22] Filed: Mar. 28, 1980

[51] Int. Cl.³ .............................................. B01D 23/20
[52] U.S. Cl. ................................................... 210/525
[58] Field of Search ....................... 210/525, 169, 512; 4/490, 496, 510, 512

[56] References Cited

U.S. PATENT DOCUMENTS

| | | | |
|---|---|---|---|
| 3,015,396 | 1/1962 | Quast | 210/525 |
| 3,034,653 | 5/1962 | Ward | 210/169 |
| 3,081,879 | 3/1963 | Schroeder et al. | 210/525 |
| 3,314,543 | 4/1967 | Nash | 4/512 |
| 3,579,657 | 5/1971 | Gurrieri | 4/490 |
| 3,618,774 | 11/1971 | Delphia | 210/169 |
| 3,792,499 | 2/1974 | Whitaker | 4/512 |
| 3,815,161 | 6/1974 | Baker | 4/512 |
| 4,054,520 | 10/1977 | McGivern | 210/525 |

Primary Examiner—Theodore A. Granger
Attorney, Agent, or Firm—Ronald L. Lyons; Roger Aceto

[57] ABSTRACT

A beach for the scum trough of a sewage settling tank or the like is biased to an upright position by a weighted member or the like so as to prevent the flow of liquid over the beach and into the scum trough. The construction of the beach allows it to be rotated against this bias to a second position below the level of liquid in the settling tank, so as to permit scum and other floating materials accumulated adjacent the beach to flow over the beach and into the scum trough.

7 Claims, 3 Drawing Figures

BEACH FOR THE SCUM TROUGH OF A SEWAGE SETTLING TANK OR THE LIKE

BACKGROUND OF THE INVENTION

The present invention relates generally to a beach for the scum trough of a sewage settling tank or the like. Such beaches are well known in the art and are used to prevent a continuous flow of liquid from the sewage settling tank over into the scum trough. In one scum trough design, the upper edge of the trough is located above the level of liquid in the tank and the beach is a rigid structure inclined downward from the top of the trough into the liquid. With this arrangement, a wiper may scrape any floating material up the inclined beach and over into the trough. British patent specification No. 390,989 illustrates such an arrangement.

In another design an upper edge of the scum trough is located below the level of liquid in the settling tank. The beach here is hinged to the upper edge of the scum trough and is provided with floats to permit the beach to float above the level of liquid in the settling tank and this prevents the liquid in the settling tank from spilling over into the scum trough. The floating beach can be forced to submerge whenever necessary to permit accumulated scum or other floating materials to flow over the submerged beach and into the scum trough. Such an arrangement is shown, for example, in U.S. Pat. No. 4,054,520.

Both of the beach designs described have disadvantages. For example, where a fixed beach is used, a wiper or scraper of one sort or another must be pushed up the fixed beach and out of the level of liquid in the settling tank. Where a floating beach is used, the wiper need not leave the level of liquid in the settling tank, but on the other hand the build up of deposits upon the beach over a period of time will hamper its operation.

SUMMARY OF THE INVENTION

In the present invention, the wall separating the scum trough from the liquid in the settling tank has its upper edge disposed below the normal level of liquid in the tank. A beach member hinged to the upper edge of this wall extends upwardly to a point above the liquid level. Extending from the beach in the opposite direction and down into the liquid in the settling tank is a lever arm. Bias means operating on the end of the lever arm biases the beach to an upright position to maintain the beach above the liquid level. With this arrangement, the skimmer of the settling tank, upon contact with the beach, rotates the beach against the bias to allow liquid to spill over the beach and into the scum trough.

DESCRIPTION OF THE PREFERRED EMBODIMENTS

Figure 1:
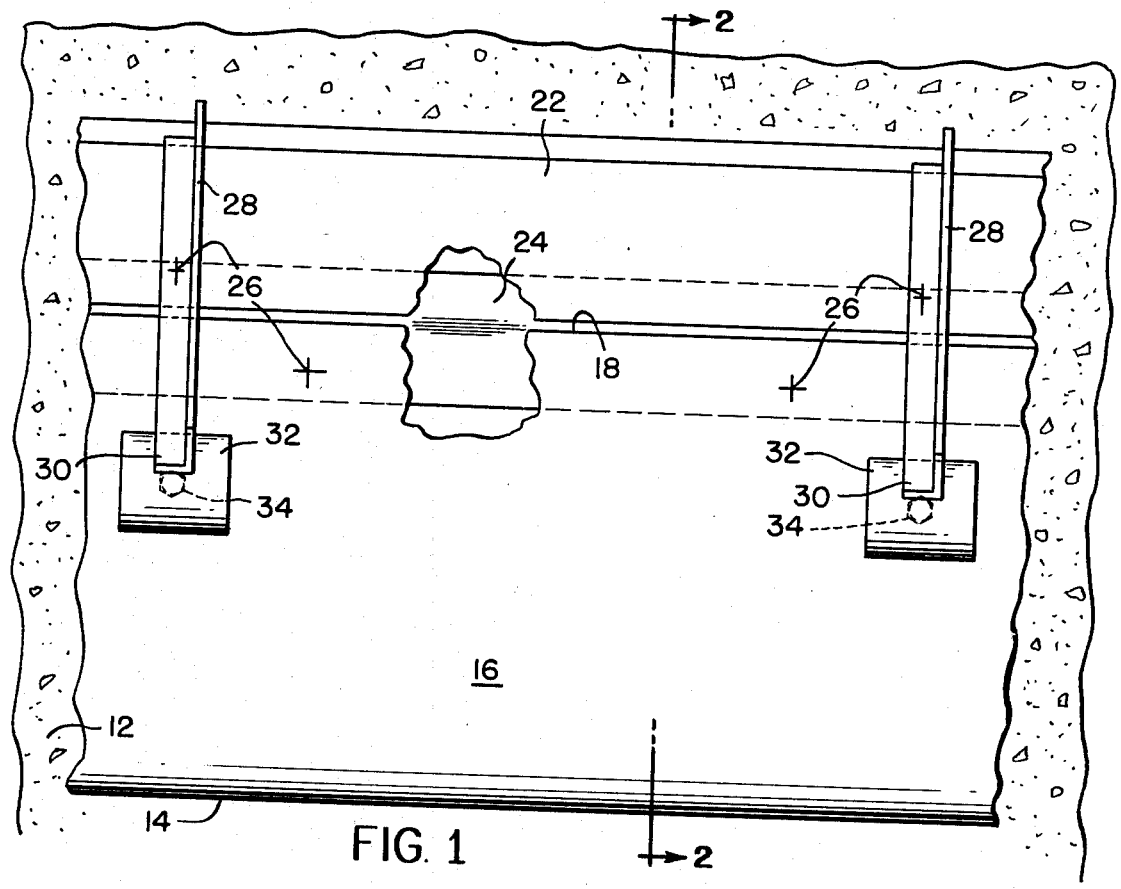
FIG. 1 is an elevation view of a portion of a scum trough employing the beach of the present invention.
Figure 2:
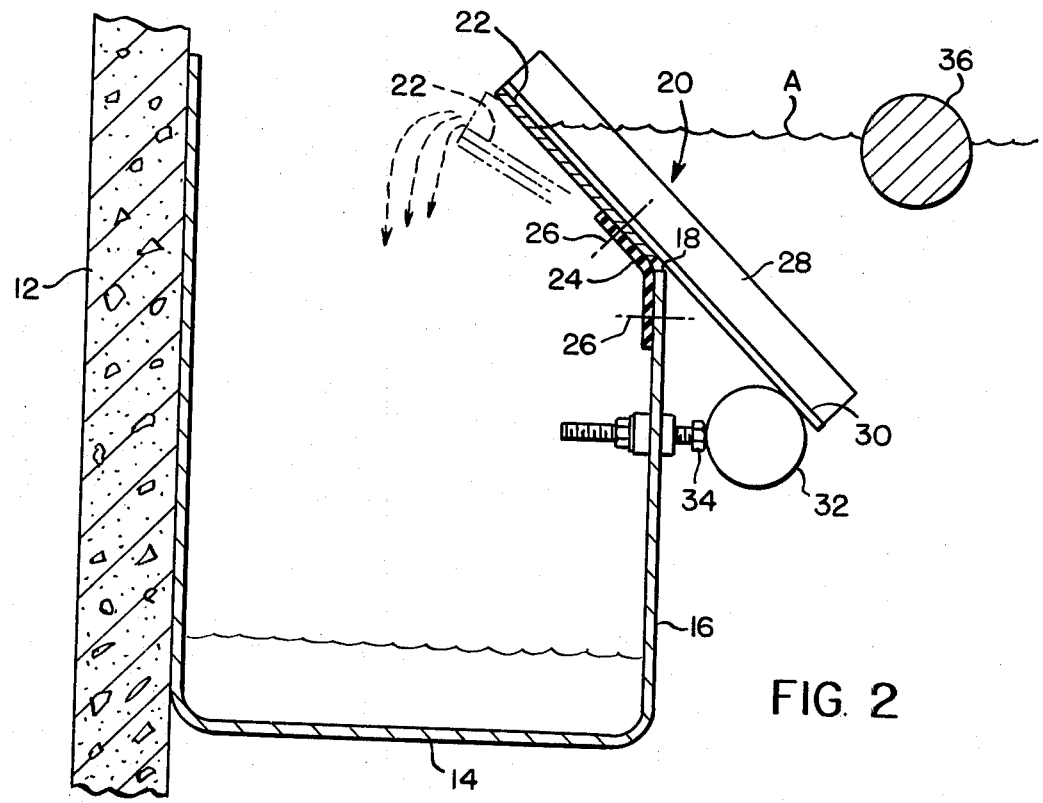
FIG. 2 is a view taken along lines 2—2 of FIG. 1.

Referring to the drawings, FIGS. 1 and 2 show a portion of the end wall 12 of a sewage settling tank. Extending along this wall is a scum trough 14. This trough may be formed either as an integral part of the settling tank wall 12 or may be a separately fabricated item which is attached to the wall by any suitable means well known in the art. As best seen in FIG. 2, the forward wall 16 of the scum trough, which separates the interior of the trough from the liquid in the sewage settling tank, has its upper end 18 disposed below the normal liquid level in the tank as indicated at A. The beach structure of the present invention for preventing the spill over of liquid into the scum trough over edge 18 is generally indicated at 20.

Beach structure 20 includes a beach plate 22 which is attached to the upper edge 18 of the trough front wall by a flexible hinge 24. This hinge runs substantially the full length of the scum trough and not only hinges beach plate 22 to the trough, but also acts as a seal between the hinge plate and the front wall 16. Any suitable means such as the stainless steel hardware 26 may be used to attach the hinge 24 to both the scum trough and the beach plate.

Fixed to and extending across the beach plate at spaced intervals are a plurality of lever arm supports 28. These supports extend from the beach plate and down into the liquid in the settling tank. The outwardly extending end 30 of each support carries a weight container 32 (FIGS. 1 and 2). These weight containers may either be solid weights or they can be hollow containers which can be filled with shot or other weight materials. In any event, the weight of containers 32 act to rotate beach plate 22 about hinge 24 to a generally upright position. In this position, as shown in solid line in the Figures, the beach plate extends above the level of liquid in the settling tank and prevents the liquid from spilling over into the scum trough.

Fixed to the front wall 16 of the scum trough is a stop 34 (FIG. 2). This stop is positioned to receive the weight container, not only to prevent damage to the front wall of the scum trough, but also to properly locate the weight container. In this respect, the stop maintains the weight container at a position spaced outwardly from the scum trough and this in turn provides the proper inclination to beach plate 22. While stop 34 can be a fixed member, it is preferred that the stop be adjustable as shown in the figures.

In operation, the action of weight container 32 maintains the beach plate 22 in a generally upright position and extending above the liquid level to prevent liquid in the settling tank from spilling over the beach and into the scum trough.

Usually in sewage settling tanks of the type described, there is some sort of skimming apparatus which is carried back and forth across the tank for urging scum and other floating materials towards the scum trough. One such system is shown, for example, in U.S. Pat. No. 4,054,520. In association with such skimming apparatus, means must be provided for lowering the beach 22 below the liquid level to permit the scum and other materials accumulated adjacent the beach to pour over into the scum trough. Such a means is represented in FIG. 2 by a wheel 36. It should be understood that this wheel is associated with the skimming apparatus and forms no part of the beach structure as such. In any event, this wheel, as it is carried by the skimming apparatus moves toward beach 22 and eventually contacts the beach. Continued movement of the wheel thereafter depresses the beach below the level of liquid in the settling tank as shown in dotted line in FIG. 2 to permit liquid to pour over the beach and into the scum trough. Thereafter, when the skimming apparatus is reversed and wheel 36 is moved to the right as viewed in FIG. 2, the counter weight action of weight container 32 returns the beach to its original, generally upright position, thus terminating the flow of liquid over the beach and into the scrum trough.

It should be appreciated that while a wheel 36 is shown for depressing the beach, any other suitable mechanical means either fixed to the skimming apparatus or fixed to the wall of the settling tank may be used to move the beach so that it is below the liquid level. Such means may be timer operated so that the beach is moved periodically or it can be operated whenever the skimming apparatus approaches the beach.

Figure 3:
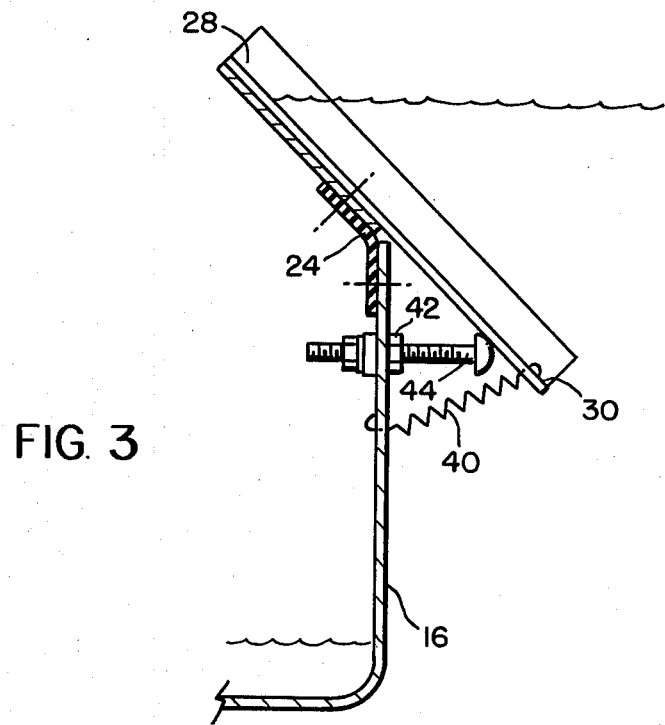
FIG. 3 is a view similar to FIG. 2 showing another embodiment of the invention.

Referring to FIG. 3, a modified form of the beach is shown wherein the weight of the container 32 of FIG. 2 is replaced by bias means such as a spring 40 which extends between wall 16 and end 30 of the support arm. FIG. 3 also shows the stop 34 of FIG. 2 as being adjustable. Such an adjustable stop, for example, could be a threaded member 44 which can be screwed into or out of housing 42 to adjust the slant or inclination of the beach.

Thus it should be appreciated that the present invention does provide a easily constructed beach structure, which is relatively foolproof in operation. In this respect, the beach of the present invention does not depend upon the buoyancy of any member to maintain it above liquid level, but instead uses a weighted member or other means to bias the beach to its normal upright position. Since buoyancy is not a factor, the operation of the beach is not hampered by a build up of deposits on the beach itself. Furthermore, the bias for holding the beach in an upright position can be easily increased where necessary, either by adding weight to container 32 or by increasing the strength of spring 40. In either case there can also be provided means for adjusting the amount of inclination of the beach where necessary, to insure that it is at the optimum orientation for proper operation.

I claim:

1. A beach for controlling spill over of liquid from a settling tank into a scum trough comprising:
   (a) an upright wall separating the scum trough from the liquid in the settling tank, the upper edge of said wall being normally below the level of liquid in the settling tank;
   (b) a beach plate hinged to and extending substantially the full length of the upper edge of said upright wall, said beach plate extending upward and inward toward said scum trough;
   (c) a member extending from said beach plate downward and into the liquid in the settling tank; and
   (d) bias means operating on said member for urging said member toward said wall, said bias means being of sufficient strength to overcome the head of liquid in the settling tank above the upper edge of said wall, said bias means acting to maintain said beach plate generally upright and extending above the level of liquid in the settling tank to prevent spill over of liquid from the settling tank and into the scum trough.

2. A beach as set forth in claim 1 wherein said bias means is a weight on the outwardly extending end of said member.

3. A beach as set forth in claim 1 wherein said bias means is a container for receiving weight elements therein to adjust the bias urging said beach plate to an upright position.

4. A beach as in claim 1 including stop means on said upright wall for maintaining the outwardly extending end of said member spaced from said upright wall.

5. A beach as in claim 4 wherein said stop means is adjustable toward or away from said upright wall.

6. A beach as in claim 5 wherein said bias means is a spring extending between said upright wall and the outwardly extending end of said member.

7. A beach as in claim 4 wherein said stop means is adjustable towards and away from said upright wall and said bias means is a weight fixed to the outward end of said member and positioned for engagement against said stop means.

* * * * *